United States Patent [19]

McCombs et al.

[11] 4,318,960

[45] Mar. 9, 1982

[54] GLASS FIBER SIZE COMPOSITION COMPRISING MALEIC ANHYDRIDE GRAFT COPOLYMER

[75] Inventors: Frank P. McCombs; Michael G. Roberts, both of Newark, Ohio

[73] Assignee: Owens-Corning Fiberglas Corporation, Toledo, Ohio

[21] Appl. No.: 51,268

[22] Filed: Jun. 22, 1979

Related U.S. Application Data

[63] Continuation of Ser. No. 849,147, Nov. 7, 1977, abandoned, Continuation-in-part of Ser. No. 354,568, Apr. 26, 1973, abandoned.

[51] Int. Cl.³ ...................... B32B 17/02; B32B 17/04; C08K 9/06; D02G 3/18
[52] U.S. Cl. ................. 428/378; 156/110 A; 428/391; 428/392; 428/429; 428/441; 428/447; 428/448; 428/521; 524/531
[58] Field of Search .............. 428/378, 391, 392, 441, 428/447, 448, 521; 260/42.15, 42.18; 156/110 A

[56] References Cited

U.S. PATENT DOCUMENTS

| | | | |
|---|---|---|---|
| 3,416,990 | 12/1968 | Robinson | 428/392 |
| 3,705,073 | 12/1972 | Marzocchi et al. | 428/392 |
| 3,816,235 | 6/1974 | Lin | 428/392 |
| 3,922,466 | 11/1975 | Ball et al. | 428/391 |
| 3,922,466 | 11/1975 | Ball et al. | 428/391 |
| 3,956,230 | 5/1976 | Gaylord | 260/42.14 |

FOREIGN PATENT DOCUMENTS 1095700  12/1967  United Kingdom ............ 260/42.14

*Primary Examiner*—James C. Cannon
*Attorney, Agent, or Firm*—Ronald C. Hudgens; Philip R. Cloutier; James B. Wilkens

[57] ABSTRACT

This invention is addressed to an improved size composition for use in the treatment of glass fibers in the manufacture of glass fiber textiles, glass fiber reinforced plastics, and glass fiber reinforced elastomeric products wherein the size is formulated to contain, as the essential ingredients, a polybutadiene graft copolymer and a glass fiber anchoring agent. bundles of glass fibers sized with the composition of the invention are particularly well suited for impregnation with an elastomer compatible material containing a resorcinol-aldehyde resin component and an elastomer component for use in the manufacture of glss fiber reinforced elastomeric products.

5 Claims, No Drawings

GLASS FIBER SIZE COMPOSITION COMPRISING MALEIC ANHYDRIDE GRAFT COPOLYMER

This application is a continuation of our co-pending application Ser. No. 849,147, entitled GLASS FIBER SIZE COMPOSITION, filed Nov. 7, 1977 and now abandoned, which was a continuation-in-part of our application Ser. No. 354,568, entitled GLASS FIBER SIZE COMPOSITION, filed Apr. 26, 1973 and now abandoned. The disclosures of both these earlier applications are incorporated herein by reference.

This invention relates to a size composition, and more particularly to a size composition for application to glass fibers to improve the processing and performance characteristics of glass fibers in glass fiber textiles, in the manufacture of glass fiber-reinforced elastomeric products and in the manufacture of glass fiber-reinforced plastics.

It is conventional practice in the manufacture of glass fibers to coat the glass fibers, preferably as they are formed, with a size composition to impart to the individual glass fibers the desired degree of lubricity without destroying the fibrous characteristics of the glass fibers. The thin film or size coating applied to the individual glass fiber surfaces serves to protect the fibers from destruction from mutual abrasion as the glass fibers are subjected to subsequent processing, such as in the formation of woven or non-woven fabrics or in the combination of the treated glass fibers with elastomeric and plastic materials in the manufacture of glass fiber-reinforced elastomeric and plastic products.

To the present, the chemical compositions of the sizes used in the treatment of glass fibers have depended, for the most part, on the intended use of the treated glass fibers. For example, if the treated glass fibers are to be used in the manufacture of glass fiber textiles, the size is preferably one which imports good hand and feel to the fabric. Alternatively, when it is desired to size the glass fibers in forming to protect the glass fibers from destruction through mutual abrasion during weaving or like processing steps and then remove the size after weaving is completed, it is desirable to employ a size which can be removed easily and completely, as by burning the size at an elevated temperature.

When the glass fibers are to be used as reinforcement for elastomeric products as in the manufacture of glass fiberreinforced drive belts, tires, and the like, the size composition is one which is compatible with, and serves to improve the bonding relationship of the glass fibers with, elastomeric materials. As is now well known to the art, the difficulties in bonding glass fibers to elastomeric materials are believed to stem in part from the fact that the glass fibers are completely smooth, rod-like members and in part from the fact that the glass fiber surfaces are highly hydrophilic in mature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems in bonding glass fibers to elastomeric materials as described above and to promote a secure bonding relationship between glass fibers and elastomeric materials, the glass fibers are sized, preferably as they are formed, with an elastomer competible size and are then formed into strands, yarns, cords, or fabrics, generally known to the art as bundles, and impregnated with a composition containing an elastomer component to intertie the glass fiber surfaces to the elastomeric material. Thus, the size composition is preferably one which is capable of establishing a bonding relationship with the impregnant to facilitate integration of the impregnated bundle with elastomeric materials.

When the treated glass fibers are for use as reinforcement for resins, such as polyepoxide, polyester, polyamide, melamine, urea or phenolic-aldehyde resins and the like, the size composition is preferably one which is compatible with such resinous systems and which is capable or establishing a secure bonding relationship with such resins.

Because of the different considerations inherent in textiles, glass fiber-reinforced elastomeric products and glass fiber-reinforced plastics, different size compositions which are specific to the intended use of the treated glass fibers have been employed.

It accordingly is an object of the present invention to provide a composition for use in the treatment of glass fibers to improve the processing and performance characteristics of the glass fibers in the manufacture of glass fiber textiles and fabrics, in the manufacture of glass fiber-reinforced elastomeric products and in the manufacture of glass fiber-reinforced resins.

It is a related object of the invention to provide a composition for use in the treatment of glass fibers which is effective to protect the glass fibers during processing and which is capable of being removed easily and completely.

It is another object of the invention to provide a composition for use in the treatment of glass fibers to improve the bonding relationship with elastomeric materials in the manufacture of glass fiber-reinforced elastomeric products.

It is a further object of the invention to provide a composition for use in the treatment of glass fibers to promote compatibility between the treated glass fibers and resins in the manufacture of glass fiber-reinforced plastics.

It is another object of the invention to provide treated glass fibers which can be used in the manufacture of textiles and glass fiber-reinforced elastomeric and plastic products.

The concepts of this invention reside in a composition for use in the treatment of glass fibers which is formulated to include as a film forming material a graft copolymer having a trunk based on butadiene and having grafted onto the trunk a graft monomer which is capable of reaction with the ethylenic unsaturation of the butadiene trunk polymer in a free radical reaction and which is incapable of undergoing homopolymerization. It has been found that the graft polymer can be employed as the film forming component of a glass fiber size composition for use in the treatment of glass fibers to promote a strong bonding relationship between glass fibers and elastomeric or resinous materials in the manufacture of glass fiber-reinforced elastomeric and plastic products. The size composition containing the graft polymer can also be used to form a fugitive size for weaving operations, after which the size is removed most frequently by burning.

As pointed out above, the graft monomers employed in the practice of the present invention (1) must be capable of reacting by a free radical mechanism with the ethylenic unsaturation of the butadiene trunk or backbone polymer and (2) must be incapable of undergoing homopolymerization. As those skilled in the art are aware, a myriad of compound satisfy criterion (1); however, criterion (2) is limiting. Graft monomers meeting both criteria are limited to those monomers containing ethylemic unsaturation whose free radicals lack stability and/or whose molecular configuration provides steric hindrance.

Preferred graft monomers include maleic anhydride, itaconic acid, alpha-methyl styrene, vinyl naphthalene, all of which have configurations which provide steric hindrance. Also contemplated are alkyl vinyl ethers in which the alkyl group contains 1 to 20 carbon atoms (e.g., methyl, ethyl, isopropyl, butyl, octyl, etc.), which form generally unstable free radicals.

The present invention includes, as the trunk polymer, not only homopolymers of butadiene but also copolymers of butadiene with one or more ethylenic monomers such as acrylonitrile, methacrylonitrile, styrene, alkyl acrylates and methacrylates in which the alkyl groups contain 1 to 4 carbon atoms, vinyl pyridine, etc. In general, the trunk or backbone should contain sufficient butadiene to provide at least 1.5 carbon-to-carbon double bonds per 1000 carbon atoms; it is preferred that copolymers contain at least 50% butadiene, and preferably 55 to 98% by weight butadiene.

The relative amount of the graft monomers reacted with backbone is not critical to the practice of the invention. Best results are usually obtained when the graft monomer constitutes from 1 to 30% and preferably 5 to 25% by weight of the backbone.

It is an important concept of the invention that the graft monomers described above be reacted so that they react with the backbone after the latter has been formed, as opposed to copolymerization. As one skilled in the art is aware, simultaneous polymerization of butadiene and, for example, maleic anhydride produces a polymer in which the maleic anhydride forms a portion of the polymeric matrix such as groups

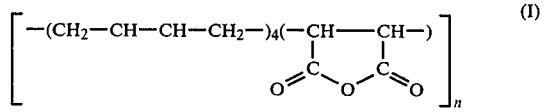

(I)

In contrast, however, the graft polymers used in the practice of this invention are prepared by grafting the graft monomer onto the existing trunk of, for example, polybutadiene whereby the maleic anhydride does not form a portion of the polymeric chain. The graft polymers can include groups

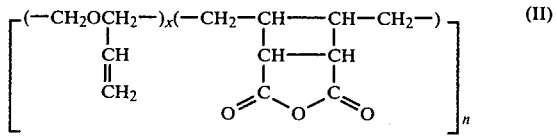

(II)

As can be seen from (II), the maleic anhydride does not become part of the polymer chain, but reacts with the ethylemic unsaturation of the butadiene trunk to form a group containing a 4-membered carbocyclic ring. The graft polymers employed in the practice of this invention are less expensive to prepare and use since the graft monomer can be reacted with a member of commerically available butadiene-based polymers.

The graft polymers employed in the practice of this invention can be prepared in a conventional manner by reacting the butadiene polymer in the form of an aqueous latex with the graft monomer in the presence of a free radical initiator, such as hydrogen peroxide, persalts such as alkali metal or ammonium persulfates or perborates and organic peroxides including tert-butyl peroxide cumyl peroxide, benzoyl peroxide, etc. The reaction is allowed to proceed for a time sufficient to permit the desired amount of monomer to be grafted to the butadiene backbone.

The resulting latex can then be formulated with the other components of the composition without the need to separate the graft polymer from the latex, if desired.

A wide variety of conventional emulsifying agents can be used in the practice of the invention to form the butadiene polymer latex. Preferred are the non-iomic emulsifying agents, such as the polyoxyethylene derivatives of fatty acid partial esters of sorbitol anhydrides or the polyoxyethylene derivatives of fatty alcohols containing 8 to 22 carbon atoms or of alkyl substituted phenols wherein the alkyl groups contain 6 to 18 carbon atoms. Such emulsifiers are commercially available and include "Tween 80" from Atlas Chemical Industries, Inc. which is a polyoxyethylene derivative of the trioleate ester of sorbitan, "Tween 60" which is a polyoxyethylene derivative of the stearate ester of sorbitan and available from Atlas, and the "Triton" series of emulsifiers from Rohm and Haas which are polyoxyethylene derivatives of alkyl-substituted phenols.

As will be appreciated by those skilled in the art, anionic and cationic emulsifying agents can also be used in the practice of the invention. Representative of such emulsifying agents are the alkali metal fatty acid sulfates (e.g., sodium lauryl sulfate), alkali metal salts of alkyl aryl sulfonates (e.g., sodium alkyl benrene sulfonates) as well as numerous others.

The composition of the invention is formulated to include at least one glass fiber anchoring agent in the form of an organo silicon compound.

As the organo silicon coupling agent, use can be made of a very wide variety of silicon containing coupling agents known to those skilled in the art to be useful for this purpose. In general, suitable organo silicon compounds include organo silanes containing 1 to 3 readily hydrolysable groups, such as halogen (bromine, chlorine, fluorine or iodine) or alkoxy having 1-6 carbon atoms, such a methoxy, ethoxy, propoxy, butoxy, etc., and containing at least one organic group attached directly to the silicon atom, with any remaining valences on the silicon atom being taken up by hydrogen. In aqueous solution, such silanes tend to hydrolyze to form the corresponding silanols and/or siloxanes and hence the anchoring agent is present in the aqueous size composition of the invention as the silane, silanol and/or siloxane.

The organic group or groups attached to the silicon atom can be any of a variety of groups including alkyl having 1-10 carbon atoms, such as methyl, ethyl, propyl, hexyl, etc.; alkenyl containing 7-8 carbon atoms, such as vinyl, allyl, etc; cycloalkyl having 4-8 carbon atoms, such as cyclopentyl, cyclohexyl, etc; aryl containing 6-15 carbon atoms, such as phenyl, naphthyl, benzyl, etc., and the halogen, amino, hydroxy, mercapto, glycidoxy or epoxy substituted derivatives thereof. It will be understood that wherein the organo silane contains more than one organic group, the various organic groups attached to the silicon atom can be the same or different from each other.

Representative of the compounds falling within the above group are ethyldichlorosilane, propyltrichlorosilane, n-butyl-trimethoxy silane, gamma-aminopropyltrimethoxy silane, delta-aminobutyltriethoxy silane, bis-(gamma-aminopropyl)dimethoxy silane, delta-aminobutylethyldimethoxy silane, betahydroxyethyltriethoxy silane, glycidoxypropyltrimethoxy silane, beta-hydroxyethyltriethoxy silane, glycidoxypropyltrimethoxy silane, gamma-chloropropyltrichlorosilane, vinyldichlorosilane, gamma-aminoallyltrimethoxy silane, beta-aminovinyltriethoxy silane, 3,4-epoxycyclohexyltrimethoxy silane, 3-aminocyclohexylethyltriethoxy silane, para-aminophenyltriethoxy silane, n-thacryloxypropyltrimethoxy silane, N-(beta-aminoethyl)-gamma-aminopropyltrimethoxy silane, gamma-merceptopropyltriethoxy silane, gamma-hydroxypropyltrimethoxy silane, as well as a variety of others. In general, those silanes preferred are those in which at least one organic group is substituted by at least one amino group.

One particularly preferred amino-subsituted organo silane which has been found to provide excellant results in the practice of the present invention is a polyfunctional amino-substituted compound marketed by Dow Corning, first under the trademark XY-2-2287 and now under the trademark Z-6050. The polyamino silane is prepared by reaction of the compounds

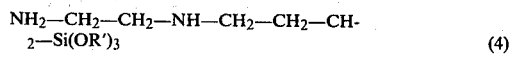

wherein R' is $C_1$ to $C_4$ alkyl (e.g., methyl, ethyl, propyl, etc.) with ethylene imine

to form the compound represented by the following:

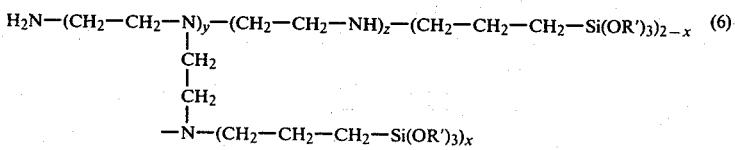

wherein x is 0 or an integer from 1 to 2 and y and z are integers.

The commercially available form is the material where R' is methyl, although it will be understood that the other alkoxy derivatives can be prepared in a like manner. In general, use is made from 1 to 10 moles of the imine per mole of diamino starting material.

While the organo silicon compounds suitable for use as a coupling agent in accordance with the present invention have been described above with reference to the organo silane, it will be understood by those skilled in the art that the above may also be used in the form of the corresponding silanols and polysiloxane polymers.

It has been found that certain combinations of the foregoing organo silicon compounds in the composition of this invention provide unexpected superior results in the manufacture of glass fiber-reinforced elastomeric products. It is particularly advantageous to employ a combination of the poly-functional amino-substituted compound designated E-6050 with an amino-substituted alkyl silane of the formula

where w is an integer from 2 to 5 and Z is a readily hydrolyzable group as described above. Preferred is gamma-aminopropyltriethoxy silane.

Another combination of anchoring agents which have been found to provide good results in this invention is a substantially equimolar mixture of

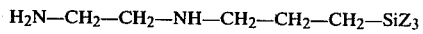

and an alkyl silane, such as methyltriethoxy silane.

The composition of the invention can be applied to glass fibers as they are formed, or after forming if desired, to form a thin film or coating on the individual glass fiber filaments. The polybutadiene graft copolymer operates as a film former on the glass fiber surfaces and is anchored thereto by means of the anchoring agent or agents described above. It has been found that the coated glass fibers are completely compatible with and can be securely bonded to elastomeric materials in the manufacture of glass fiber-reinforced elastomeric products and to plastic resins in the manufacture of glass fiber-reinforced plastics.

The relative proportions of the polybutadiene graft copolymer, emulsifying agent, and anchoring agent in the composition of this invention are not critical and can be varied within wide limits. It is generally preferred that the polybutadiene component range from 5 to 30 parts by weight of the composition on a dry basis, and preferably 7 to 25 parts by weight. The amount of emulsifying agent should be an amount sufficient to emulsify the polybutadiene and provide a stable system. It has been found that an amount within the range of 5 to 30 parts by weight on a dry or water-free basis is generally sufficient.

The total amount of anchoring agent can similarly be varied within wide ranges. Usually, an amount within the range of 1.0 to 15, and preferably 2 to 8 parts by weight on a dry or water-free basis is sufficient. When use is made of two or more anchoring agents, each is employed in a weight ratio of within the range of ⅓ to 3 based on the weight of each of the other anchoring agents.

The composition of the present invention is quite stable and can be stored over long periods of time if desired. The stability of the composition can be further improved by adding thereto a gel agent to adjust the viscosity to a desired level, preferably a viscosity of 100 to 300 cps. The gel agent renders the composition thixotropic and thus provides the additional advantage of maintaining the composition on the glass fiber surfaces as the glass fibers are randomly whipped during the forming process.

As the gel agent, use can be made of a wide variety of materials having thixotropic properties. For this purpose, use is preferably made of gel agents formed of cellulose or cellulose derivatives, including carboxymethyl cellulose as well as lower alkyl and lower alkylene glycol ethers of cellulose or methyl cellulose. For example, use can be made of the dimethyl ether of cellulose, the diethyl ether of cellulose, etc., wherein the alkyl in the ether contains 1-4 carbon atoms, including methyl, ethyl, propyl, etc. As indicated above, use can also be made of lower alkylene glycol ethers of cellulose and methyl cellulose wherein the glycol forming the ether contains 2-4 carbon atoms, including ethylene glycol, propylene glycol and butylene glycol. Representative of suitable cellulose and cellulose derivatives include dimethyl ether of cellulose, ethylene glycol ethers of cellulose, such as hydroxyethyl cellulose marketed by Dow Chemical Company under the trademark XD 1300, propylene glycol ethers of methyl cellulose, which are marketed by Dow Chemical Company under the trade name Methocel MG, methyl cellulose, which is marketed by Dow under the trade name Methocel MC, and butylene glycol ethers of methyl cellulose which are marketed by Dow under the trade name Methocel MD. In addition to the cellulose-type gel agents described above, use can also be made of various other gel agents such as the cross-linked polyacrylamides marketed by Dow Chemical Company under the designation "SA 1300".

The amount of gel agent is not critical and in an amount sufficient to adjust the viscosity to within the desired range. An amount of gel agent within the range of 0.5 to 10 parts is generally sufficient.

Having described the basic concepts of the present invention, reference is now made to the following examples which are provided by way of illustration and not by way of limitation, of the practice of the invention in formulating the composition of the invention and the treatment of glass fibers in accordance with the invention.

EXAMPLE 1

A liquid polybutadiene having an average molecular weight of 3000 (Lithene O H from Lithium Corporation of America) is emulsified with a emulsifying agent (Tween 85) using 10 parts by weight polybutadiene, 10 parts by weight emulsifier and 100 parts by weight water.

Thereafter, 1.6 parts by weight maleic anhydride and 0.05 parts by weight benzoyl peroxide are added to the resulting latex. The reaction is then carried out for 12 hours at 120° C. The resulting graft polymer is found to contain about 15% maleic anhydride grafted onto the butadiene backbone.

The graft copolymer is then formulated into the following size composition:

|  | Parts by Weight |
| --- | --- |
| Polybutadiene graft polymer | 11.5 |
| Emulsifying agent (Tween 85) | 10.0 |
| Gamma-aminopropyltriethoxy silane | 3.5 |
| Polyamino silane (A-60 0) | 1.9 |
| Gel agent (hydroxyethyl cellulose) | 2.1 |
| Water | 780. |

The final composition has a solids content of 7.5%. This composition can be applied to glass fibers as they are formed, or afterwards, as desired, in a conventional manner. It is generally desirable to apply the composition in an amount sufficient to deposit a coating of dry solids constituting 0.1 to 15% by weight.

The resulting sized fibers, usually in the form of strands, can be processed directly into textile fabrics or can be combined with plastic resins in the manufacture of glass fiber-reinforced plastics. When used in the manufacture of glass fiber-reinforced elastomeric products, the strands are preferably plied with other strands and twisted to form yarns, threads, or cords which may be used as reinforcement, with or without cutting to shorter lengths, and which can be formed into woven of non-woven fabrics for subsequent combination with elastomeric materials.

EXAMPLE 2

Using the procedure described in Example 1, the liquid polybutadiene is reacted with butyl vinyl ether in the presence of benzoyl peroxide. The graft polymer is found to contain 12% by weight of the butyl vinyl ether; it is formulated into the following size composition:

|  | Parts by Weight |
| --- | --- |
| Polybutadiene graft polymer | 10.0 |
| Emulsifying agent | 8.0 |
| Gamma-aminopropyltriethoxy silane | 4.0 |
| Water | 700. |

The composition is found to have a solids content of about 2.8% by weight, and can be applied to coat glass fibers as described in Example 1.

EXAMPLE 3

Using the procedure described in Example 1, the liquid polybutadiene is reacted with itaconic acid in the presence of a free radical catalyst to form a graft polymer containing 7% itaconic acid by weight. The resulting latex is formulated into the following composition:

|  | Parts by Weight |
| --- | --- |
| Polybutadiene graft polymer | 10.0 |
| Emulsifying agent | 9.5 |
| Gamma-aminopropyltriethoxy silane | 4.1 |
| Polyamino silane (Z-6050) | 2.1 |
| Lubricant (Sulfonated mineral oil, Twitchell 7440 from Emery Chemicals) | 2.7 |

The balance of the composition is water which is present in an amount to adjust the solids content to within the range of 0.5 to 20% by weight. The composition of Example 3 can be applied to form a thin film coating in accordance with the procedure described in Example 1.

As desired, a wide variety of glass fiber lubricants can be used in accordance with the concepts of the present invention as illustrated in Example 3. Glass fiber lubricants are well known to those skilled in the art and include fatty acid amines containing 8-36 carbon atoms, such as lauryl amine, stearyl amine, palmityl amine, etc., solubilizable mineral oils, such as sulfonated mineral oils marketed by Emery (e.g., Twitchell 7440) and amides prepared by the reaction of a fatty acid containing 8-36 carbon atoms, such as lauric acid, palmitic acid, oleic acid, linoleic acid with poly(polyoxyethylene) amines. Another lubricant which can be used in the present invention is an amide formed by the reaction of one of the fatty acids mentioned above with a polyamine having the formula:

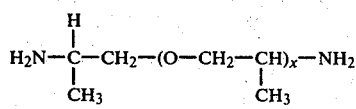

wherein x is an integer. Suitable amines of this type are marketed by Jefferson Chemical and have average molecular weights ranging up to about 2000. The reaction between the fatty acid and the polyamine can be conveniently carried out by admixing the amine with the acid in a molar ratio of at least 2 moles of acid per mole of amine, and heating the mixture to a temperature between 50°–100° C. However, it will be understood to those skilled in the art that a wide variety of other glass fiber lubricants in addition to those specifically described above can be used in accordance with the concepts of the present invention. Similarly, it is possible, and sometimes desirable, to use mixtures of the foregoing lubricants where use is made of a lubricant.

Additional size compositions embodying the concept of the invention are as follows:

EXAMPLE 4

The liquid polybutadiene of Example 1 is reacted with alpha-methyl styrene in an amount sufficient to provide a graft polymer containing 3% by weight alpha-methyl styrene. The graft polymer is formulated into the following size composition:

|  | Parts by Weight |
| --- | --- |
| Polybutadiene graft polymer | 8.9 |
| Emulsifying agent | 7.9 |
| Glycidoxypropyltriethoxy silane | 3.5 |
| Gel agent | 2.0 |
| Lubricant | 5.0 |

EXAMPLE 5

A latex of a copolymer of 80% by weight butadiene and 20% acrylonitrile is reacted with maleic anhydride in the presence of benzoyl peroxide in a weight ratio of about 10 parts by weight of the copolymer per 1.0 part by weight of the maleic anhydride. The resulting graft polymer is found to contain about 8% by weight of the maleic anhydride.

This copolymer is formulated into the following size composition:

|  | Parts by Weight |
| --- | --- |
| Butadiene-acrylonitrile graft copolymer | 10.3 |
| Emulsifying agent | 8.1 |
| Gamma-mercaptopropyltriethoxy silane | 4.3 |
| Lubricant | 3.0 |

EXAMPLE 6

A latex of a terpolymer of 15% by weight vinyl pyridine, 70% by weight butadiene, and 15% styrene (Pliolite VP 100 from Goodyear) is reacted with actyl vinyl ether in a weight ratio of 10 parts by weight of terpolymer per 0.6 parts by weight of the ether. The resulting graft terpolymer which is found to contain 5% of the actyl vinyl ether, is formulated into the following size composition:

|  | Parts by Weight |
| --- | --- |
| Graft terpolymer | 10.5 |
| Emulsifying agent | 10.0 |
| Gamma-aminopropylmethyoxy silane | 4.0 |
| Polyamino silane (K-6050) | 2.0 |
| Gel agent | 2.0 |

Each of the compositions of Examples 4 to 6 is prepared and used in the treatment of glass fibers in accordance with the procedure described in Example 1. Water constitutes the balance of each composition and is present in an amount sufficient to provide the desired solids content.

The glass fibers treated with the compositions of Examples 1 to 6 can be used in the formation of textiles, such as woven and non-woven fabrics, in accordance with conventional processing techniques. Alternatively, the fibers treated with one of the compositions of Examples 1 to 6 can be directly combined with plastic resins in the manufacture of glass fiber-reinforced plastics, laminates, coated fabrics and the like. The thin film coating of the invention on the surfaces of the individual glass fiber filaments operates to securely anchor the glass fibers to the plastic resin.

In the preferred use, glass fibers which have been treated in accordance with the present invention are employed as reinforcement for elastomeric materials in the manufacture of glass fiber-reinforced elastomeric products such as tires, drive belts, V-belts, etc. Glass fibers having a size coating thereon embodying the concepts of this invention can be combined directly with elastomeric materials without further processing whereby the coating formed of the butadiene-based graft polymer and the anchoring agent serves to securely bond the glass fiber surfaces to the elastomeric material. The butadiene-based graft polymer component of the coating is capable of undergoing curing and/or vulcanization with the elastomeric material constituting the continuous phase.

However, it is frequently preferred to form the fibers treated with the size composition of this invention into cords formed of two or more strands of sized fibers which have been plied and twisted together, yarns, threads, or fabrics, referred to as bundles, and subject the bundles of sized fibers to impregnation with an elastomer compatible material.

It has been found in accordance with a further concept of the invention that the size composition of this invention is particularly effective in promoting a strong bonding relationship with elastomeric materials in the manufacture of glass fiber-reinforced elastomeric materials where bundles of glass fibers which have been sized with the composition of the invention are impregnated with an impregnating composition formulated to contain a resorcinol-aldehyde resin component and an elastomer component. The impregnating composition described in U.S. Pat. No. 3,567,671 is particularly suitable for use in the practice of this invention, and is formulated to include, as essential components, a resorcinol-aldehyde resin, a vinyl pyridine-butadiene-styrene terpolymer, a microcrystalline paraffin wax, and a vinyl chloride-vinylidene chloride copolymer or carboxylated butadiene-styrene copolymer.

This concept of the invention may be illustrated by the following examples:

EXAMPLE 7

Using the procedure described in the above application, an impregnating composition is formulated as follows:

| Impregnating Composition | Total Parts by Weight |
|---|---|
| Resorcinol-formaldehyde resin latex (Penacolite R 2170 - 17% solids) | 48 |
| Vinyl pyridine-butadiene-styrene terpolymer latex (Gentac FS - 42% solids) | 900 |
| Vinyl chloride-vinylidene chloride copolymer latex (Dow Latex 874 - 50% solids) | 350 |
| Microcrystalline paraffin wax (Vultex Wax Emulsion No. 5 - 56% solids) | 100 |
| Water | 832 |

Impregnation with the aqueous composition of Example 7 can be carried out by way of any of a variety of known techniques for the impregnation of glass fiber bundles. The resulting bundle is formed of a plurality of glass fibers which have a size coating formed from one of the components of Examples 1 to 6 on the surfaces of the individual filaments. The impregnant in the form of the solids from the treating composition of Example 7 completely penetrates the bundle and serves to separate the glass fibers each from the other to form a unitary bundle structure.

The relative proportions of the components of the impregnating composition of Example 5 can be varied within wide limits; preferred proportions are set forth in the following general example:

EXAMPLE 8

|  | Parts by Weight Solids |
|---|---|
| Resorcinol-formaldehyde resin | 2–10 |
| Butadiene-styrene vinyl pyridine terpolymer | 20–60 |
| Vinyl chloride-vinylidene chloride copolymer | 15–40 |
| Microcrystalline paraffin wax | 23–30 |

The balance of the foregoing composition is water and the amount of water is adjusted to provide a solids content within the range of 20 to 55% by weight. Application of the impregnating composition is usually made in an amount sufficient to deposit in the sized fiber bundle dry solids constituting from 10 to 25% by weight of the fiber system.

Improved results are obtained when the vinyl chloride-vinylidene chloride copolymer is replaced by dicarboxylated butadiene-styrene copolymer such as Pliolite 4121 from Goodyear. This copolymer is prepared by interpolymerization of butadiene and styrene in the presence of a dicarboxylic acid or anhydride.

Such a composition is illustrated by way of the following general example:

EXAMPLE 9

| Impregnating Composition | Parts by Weight Solids |
|---|---|
| Resorcinol-formaldehyde resin | 2–10 |
| Butadiene-styrene-vinylpyridine | 20–60 |
| Dicarboxylated butadiene-styrene copolymer (Pliolite 4121) | 15–40 |
| Microcrystalline paraffin wax | 2–30 |
| Water to desired solids content |  |

The size composition is particularly well suited for use in the treatment of glass fibers which are impregnated with the composition described in copending application Ser. No. 230,723, filed Apr. 24, 1972, now U.S. Pat. No. 3,787,224. The impregnating compositions described therein are formulated to include a low amount of an aldehyde and/or a slow release aldehyde component such that total ratio of aldehyde to resorcinol is less than 0.95 and preferably less than 0.8 in the absence of ammonia. When used, the slow release aldehyde compound may be any one of hexamethylene tetramine, paraformaldehyde, trioxymethylene and alkyl ethers of hexamethylol melamine. For a further description of such compositions, reference can be made to the foregoing copending application, the disclosure of which is incorporated herein by reference.

Examples of this concept of the invention may be illustrated by the following:

EXAMPLE 10

| Part A: | | |
|---|---|---|
| | 50 parts by wt. | deionized water |
| | 100 parts by wt. | resorcinol-formaldehyde resin (75% solids) |
| Part B: | | |
| | 835 parts by wt. | vinyl pyridine-butadiene-styrene terpolymer (42% solids) (Gentac FS) |
| Part C: | | |
| | 430 parts by wt. | dicarboxylated butadiene-styrene copolymer (50% solids) |
| | 100 parts by wt. | Vultex Wax Emulsion No. 5 (55% solids) |
| Part D: | | |
| | 20 parts by wt. | deionized water |
| | 11.5 parts by wt. | formalin |

EXAMPLE 11

| Part A: | | |
|---|---|---|
| | 73 parts by wt. | deionized water |
| | 100 parts by wt. | resorcinol-formaldehyde latex (75% solids) |
| Part B: | | |
| | 900 parts by wt. | butadiene-styrene-vinyl pyridine terpolymer (Gentac 107–42% solids) |
| Part C: | | |
| | 420 parts by wt. | dicarboxylated butadiene-styrene copolymer (50% solids) |
| | 100 parts by wt. | Vultex Wax Emulsion No. 5 (55% solids) |
| Part D: | | |
| | 300 parts by wt. | dionized water |
| | 640 parts by wt. | hexamethylene tetramine |

EXAMPLE 12

| Part A: | | |
|---|---|---|
| | 73 parts by wt. | deionized water |
| | 100 parts by wt. | resorcinol-formaldehyde latex (75% solids) |
| Part B: | | |
| | 900 parts by wt. | butadiene-styrene-vinyl-pyridine terpolymer (Gentac 107-42% solids) |
| Part C: | | |
| | 420 parts by wt. | dicarboxylated butadiene-styrene copolymer (50% solids) |
| | 100 parts by wt. | Vultex Wax Emulsion No. 5 (55% solids) |
| Part D: | | |
| | 300 parts by wt. | deionized water |
| | 172 parts by wt. | hexamethylene tetramine |

The foregoing compositions are prepared in accordance with the procedure described in the foregoing application, and the resulting compositions can be applied by impregnation to bundles of glass fibers which have been sized with one of the compositions of Examples 1 to 6. In general, the impregnating compositions used in the practice of this invention are diluted with sufficient water to provide a composition having a solids content within the range of 10-50% by weight. Application of the impregnating composition can be made in an amount sufficient to impregnate with dry solids of 5-30% by weight of the glass fiber bundle, and preferably 10-25% by weight.

While not equivalent to the compositions of Examples 8 to 12, use can be made of other impregnating compositions known to those skilled in the art. Such compositions are generally formulated to contain 2 to 10 parts by weight of a resorcinol-aldehyde resin component and 20 to 60 parts by weight of at least one elastomer component. For a further description of such compositions, reference can be made to U.S. Pat. Nos. 3,567,671 and 3,591,357.

It will also be understood that the compositions of Examples 1 to 6 may also be used as impregnating compositions, if desired, for application to bundles of unsized fibers or fibers containing a conventional glass fiber size on the surfaces thereof. For this purpose, it is generally desirable to formulate such compositions with a higher solids content, preferably within the range of 10 to 50% solids by weight, to assure that sufficient solids penetrate the bundle to fill the interstices between the fiber filaments forming the bundle.

In facilitating the combination of glass fibers treated in accordance with the present invention with elastomeric materials, the individual glass fibers containing a coating on the surfaces thereof from Examples 1 to 6 or bundles of glass fibers sized with one of the compositions of Examples 1 to 7 and impregnated with a composition of the type shown in Examples 7 to 12 are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation, and use without departing from the spirit of the invention, especially as defined in the following claims.

We claim:

1. Glass fibers having a size coating thereon, said size coating comprising a preformed film-forming graft polymer formed of a trunk polymer selected from the group consisting of polybutadiene and copolymers of butadiene and at least one monomer selected from the group consisting of styrene, acrylonitrile, methacrylonitrile, alkyl acrylates and methacrylates wherein the alkyl groups have from 1 to 4 carbon atoms and vinyl pyridine, on which trunk polymer there is grafted a monomer of maleic anhydride, and a glass fiber anchoring agent in the form of an organosilicon compound.

2. Glass fibers as defined in claim 1 wherein the graft monomer constitutes from 1–30% by weight of the backbone.

3. Glass fibers as defined in claim 2 wherein the coating contains 5 to 30 parts by weight of the polymer and 1 to 15 parts by weight of the anchoring agent.

4. Glass fibers as defined in claim 2 wherein the anchoring agent is at least one organo silane containing 1 to 3 hydrolyzable groups and containing at least one organic group attached directly to the silicon atom, with any remaining valences on the silicon atom being taken up by hydrogen, the corresponding silanols and siloxanes.

5. Glass fibers as defined in claim 2 wherein the anchoring agent is a mixture of a silane of the formula $$Z_3-Si(CH_2)_w-NH_2$$

where Z is a hydrolyzable group and w is an integer from 1 to 3 and a compound of the formula

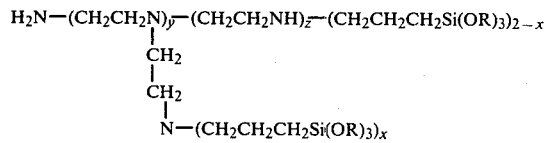

where R is a lower alkyl, x is an integer from 0 to 2 and y and z are integers, their corresponding silanols and siloxanes.

* * * * *